United States Patent [19]

Mouton, Jr. et al.

[11] 4,095,918
[45] Jun. 20, 1978

[54] TURBINE WHEEL WITH CATENARY BLADES

[76] Inventors: William J. Mouton, Jr., Box 10515, New Orleans, La. 70181; David F. Thompson, Box 183, Darby, Pa. 19023

[21] Appl. No.: 746,971

[22] Filed: Dec. 2, 1976

Related U.S. Application Data

[60] Continuation-in-part of Ser. No. 622,568, Oct. 15, 1975, abandoned, which is a division of Ser. No. 467,772, May 7, 1974, abandoned.

[51] Int. Cl.$^2$ ............................................. F01D 25/28
[52] U.S. Cl. ................... 415/7; 415/121 G; 415/148; 290/54; 416/143; 416/189
[58] Field of Search .............. 415/2, 4, 7, 113, 122 A; 115/34 B; 416/189, 132, 141 A, 240, 227, 146; 290/54

[56] References Cited

U.S. PATENT DOCUMENTS

| 818,804 | 4/1906 | Winch | 416/20 |
|---|---|---|---|
| 1,868,113 | 7/1932 | Ljungstrom | 416/143 |
| 2,085,282 | 6/1937 | Waterual | 416/189 |
| 2,306,840 | 12/1942 | Waterual | 415/122 A |
| 3,487,805 | 1/1970 | Satterthwait et al. | 416/189 |
| 3,501,090 | 3/1970 | Stoffer et al. | 416/241 A |
| 3,655,294 | 4/1972 | Thatcher | 415/122 A |
| 3,695,780 | 10/1972 | Velkoff | 416/189 |
| 3,772,886 | 11/1973 | Cameron | 415/122 A |
| 3,986,787 | 10/1976 | Mouton, Jr. et al. | 415/7 |

FOREIGN PATENT DOCUMENTS

| 1,037,243 | 4/1953 | France | 416/132 |
|---|---|---|---|
| 691,482 | 5/1940 | Germany | 415/113 |
| 581,956 | 10/1946 | United Kingdom | 416/189 |

*Primary Examiner*—C. J. Husar
*Attorney, Agent, or Firm*—Rollin D. Morse

[57] ABSTRACT

A turbine wheel on a horizontal axis is coaxially mounted within a primary nozzle, for support in a fluid current below a platform carrying electrical power generation equipment. The turbine wheel and primary nozzle are submerged and oriented to enable flow of a portion of fluid current through the nozzle and past the turbine wheel.

The turbine wheel comprises a shroud-ring rim, a set of blades extending inwardly toward the axis, the blades being mounted at their outer ends on the inside of the rim, and at their inner ends on the outside of an axial hub. Each blade has its longitudinal tensile elements shaped in the form of part of a relaxed catenary, extending from rim to hub, with sufficient bow in the direction of force of fluid current on the blade to provide a practical wheel of reasonable cost. Struts and strut vanes supporting hub elements within the nozzle may also be of relaxed catenary configuration.

16 Claims, 24 Drawing Figures

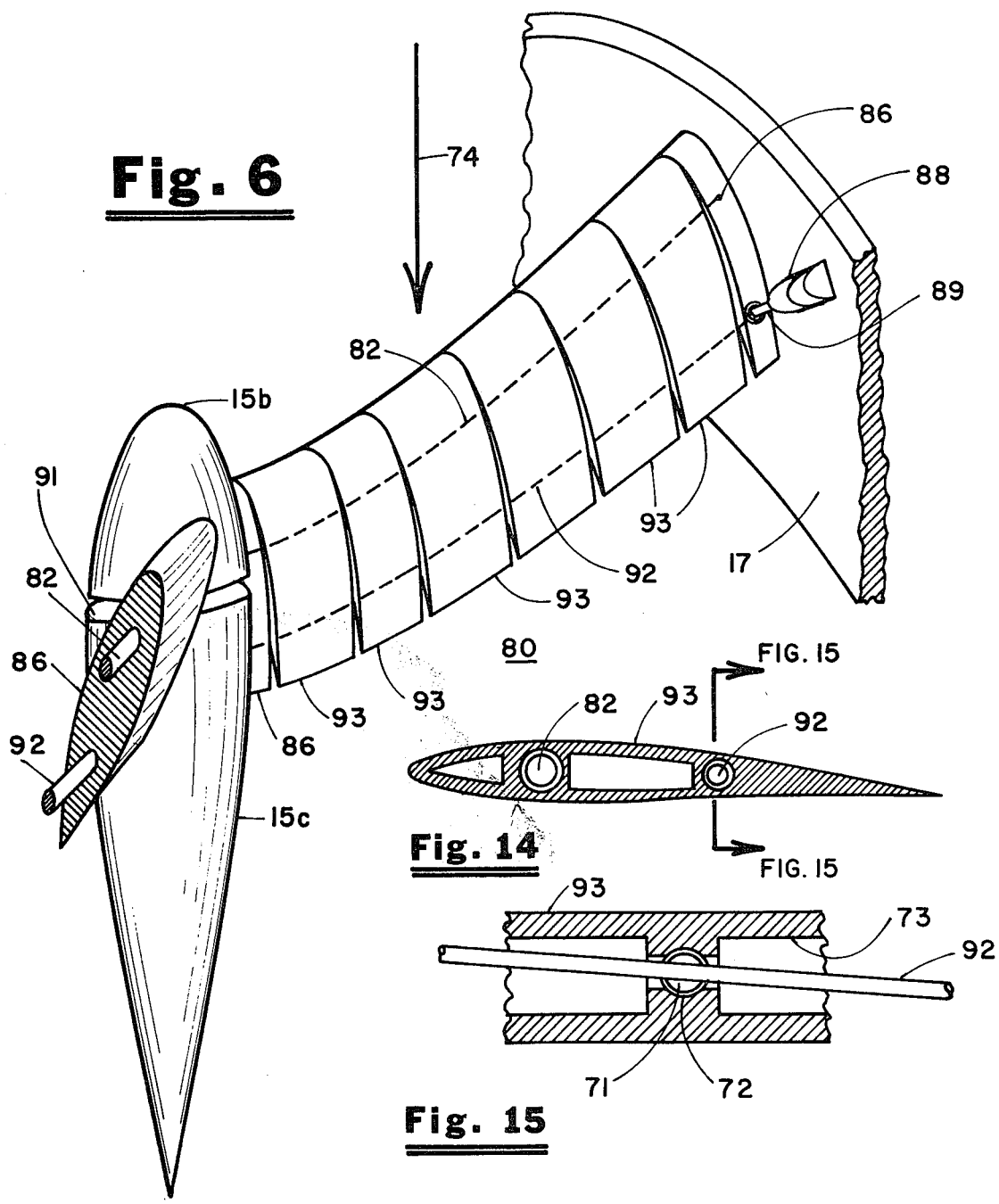

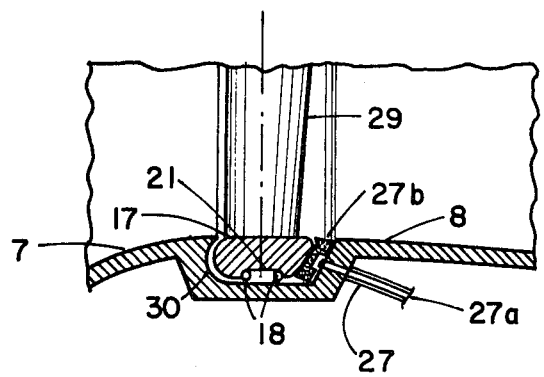
Fig. 7
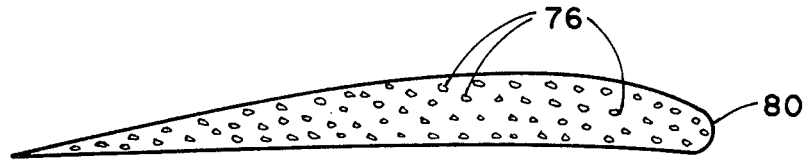
Fig. 16 - Alt. A
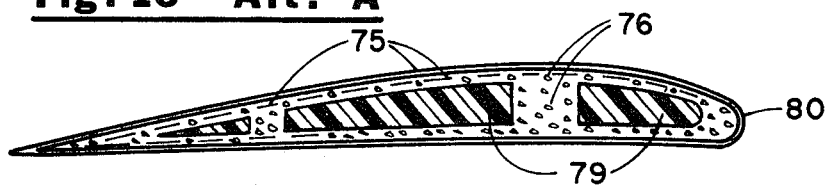
Fig. 16 - Alt. B
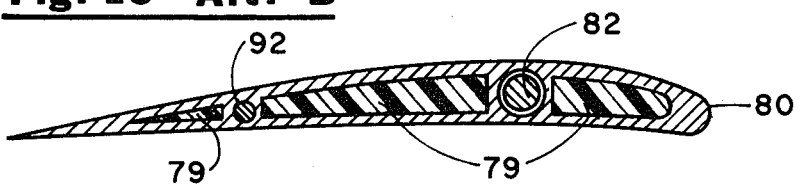
Fig. 16 - Alt. C
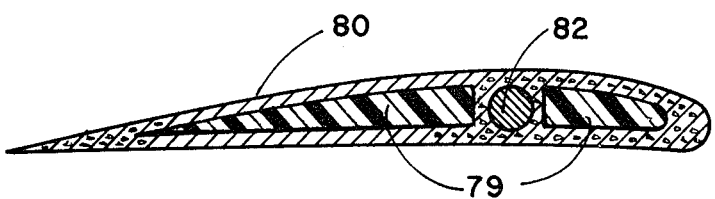
Fig. 9a
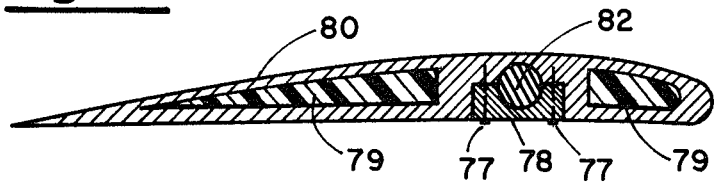
Fig. 9b

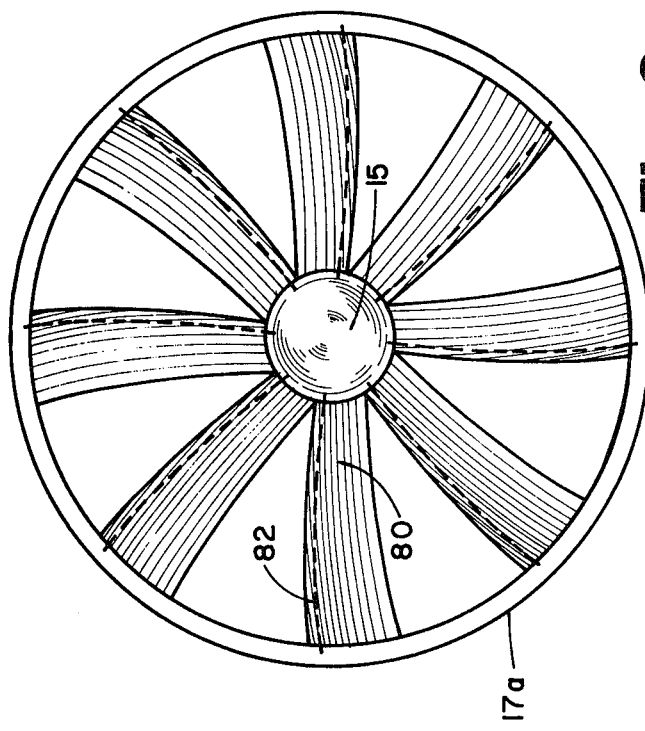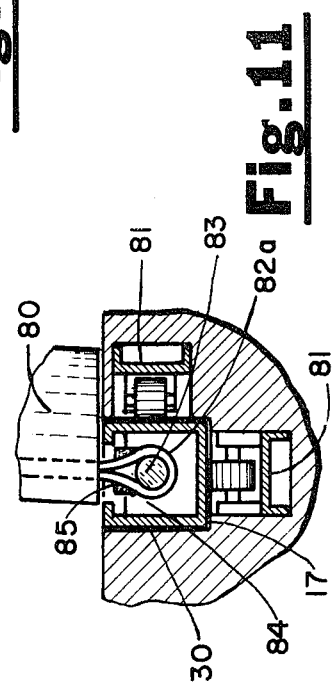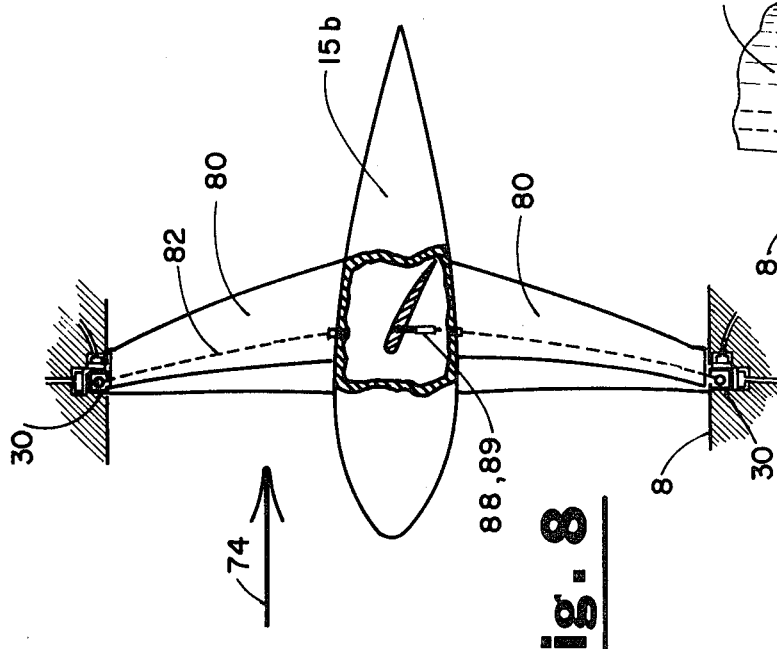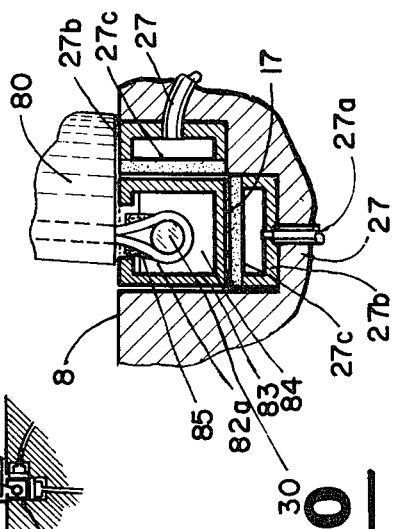

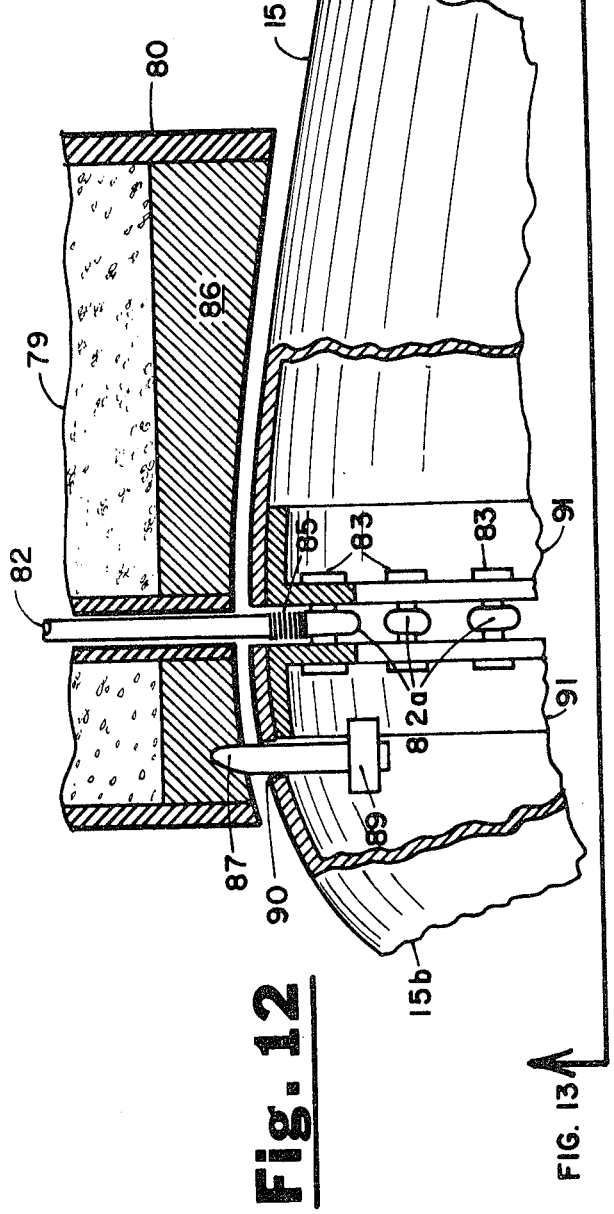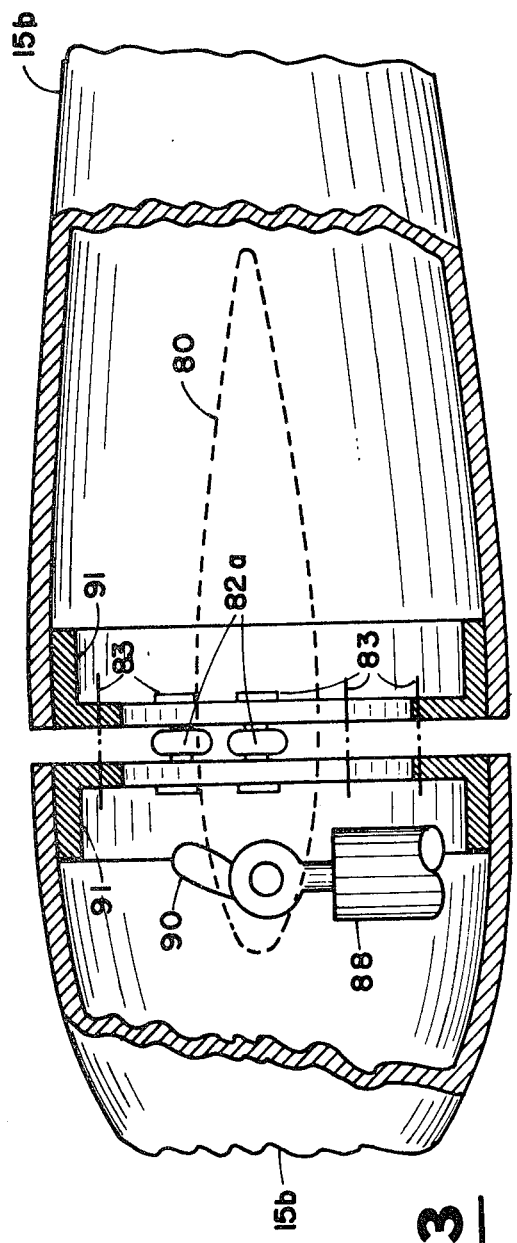

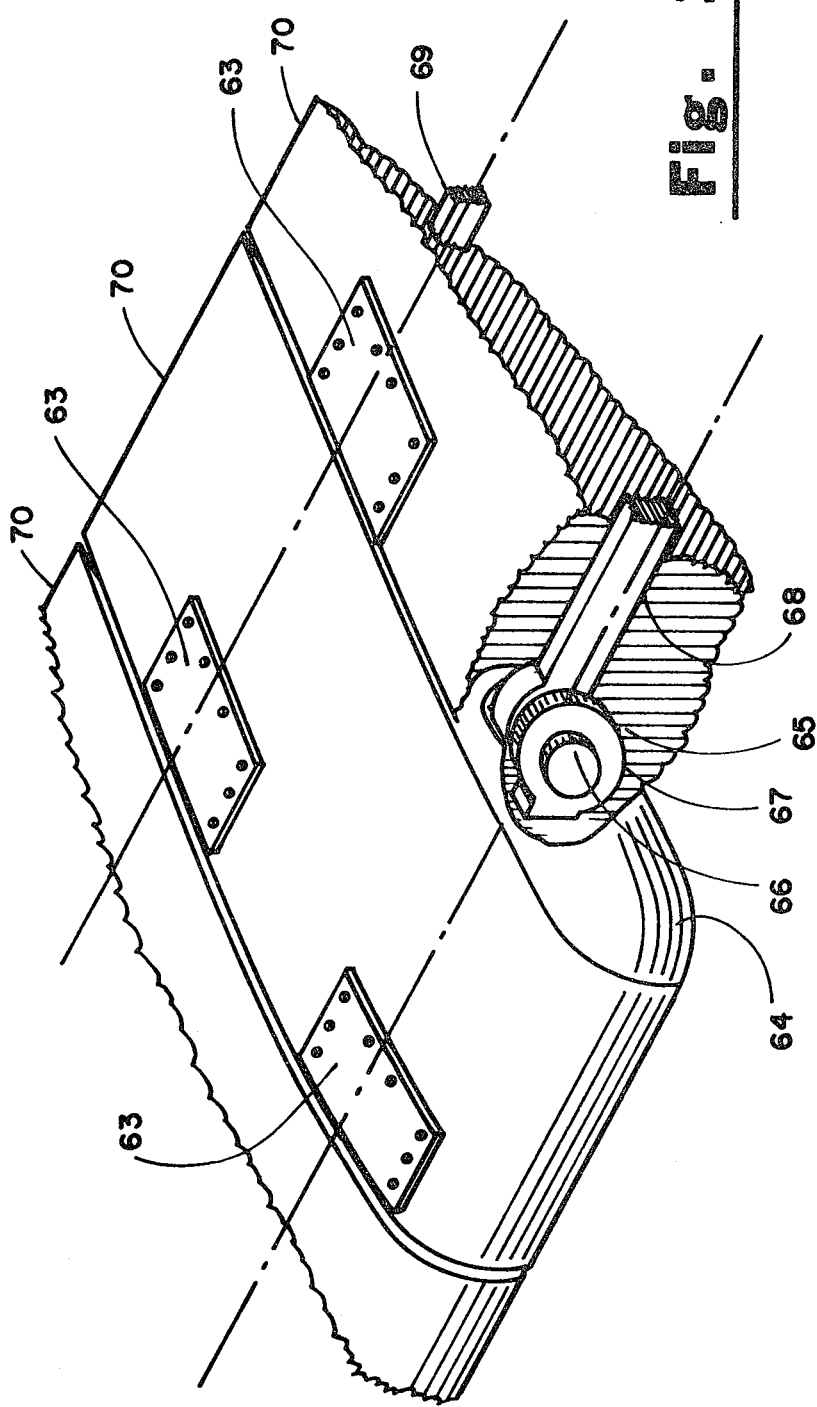

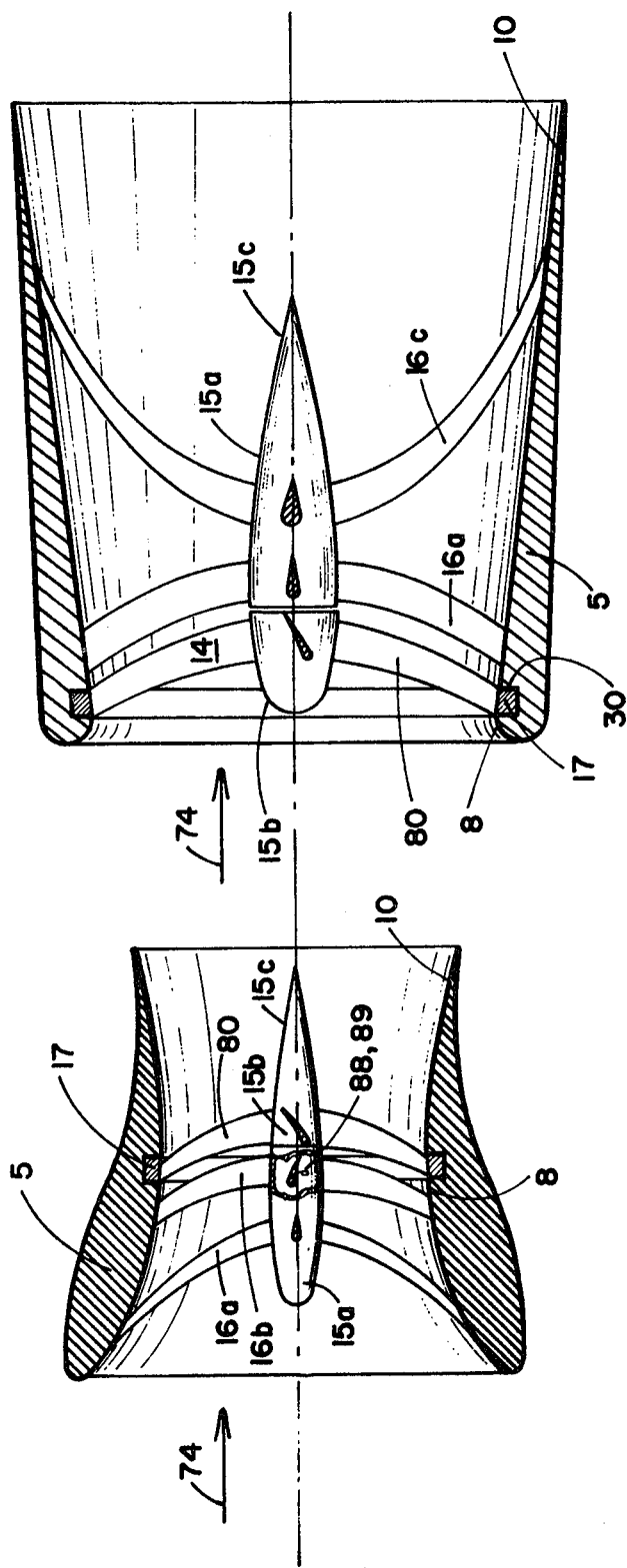

TURBINE WHEEL WITH CATENARY BLADES

INTRODUCTION

This patent application is a continuation in part of application Ser. No. 622,568, filed Oct. 15, 1975, now abandoned which is a division of application Ser. No. 467,772 filed May 7, 1974, now abandoned, and refiled as application Ser. No. 622,567, issued as U.S. Pat. No. 3,986,787.

OBJECTS

Objects of the present invention include the following:

(1) Providing turbine means adequate to harness some of the sun's energy represented in the rainfall collected in large rivers, such as the Mississippi.

(2) Enabling the construction of very large turbine means adequate to energy recovery from large ocean currents such as the Gulf current.

(3) Application of modern technology and materials of construction for the building of large navigable power plants of high efficiency and moderate cost.

(4) Enabling the production of electrical power in large quantities, with precise control of frequency and synchronization such that the power can be merged with conventional electrical power generation systems, despite fluctuations in river flow.

(5) Controlling stresses for best utilization of properties of materials of construction.

(6) Effecting economies in the making of huge structures capable of handling even such currents as that from the Gulf of Mexico.

FIGURES

FIG. 6 shows a sectioned perspective view of a relaxed catenary blade.

FIG. 7 shows the shroud-ring rim of the turbine wheel in its recess in the nozzle, with its pulley groove, belt, and water bearing.

FIG. 8 shows a view of the turbine wheel, at right angles to its axis in partial section, and within its recess in the nozzle.

FIG. 9 shows a face view of the wheel, with details of the blade sections in FIGS. 9a and 9b.

FIG. 10 shows some detail of the water bearing.

FIG. 11 shows a form of roller bearing, or trunnion.

FIG. 12 shows a partial section of the wheel hub, with blade attachment detail.

FIG. 13 is a view at right angles to the above, the show blade pitching mechanism.

FIG. 14 shows a blade section using twin catenary cables.

FIG. 15 shows provision of a ball-and-socket arrangement with in the blade to enable tilting of segments.

FIG. 16 (A,B,C) show alternative dispositions of blade tensile elements within the blade sections.

FIG. 17 shows in partial section an articulated blade.

FIG. 19 shows a nozzle with its turbine wheel, in which the wheel bearing struts and strut-vanes are shaped as relaxed catenaries.

FIG. 20 shows another form of nozzle, with one strut built as a relaxed inverted catenary.

GENERAL DESCRIPTION OF PRIOR ART SITUATION

Figure 1:
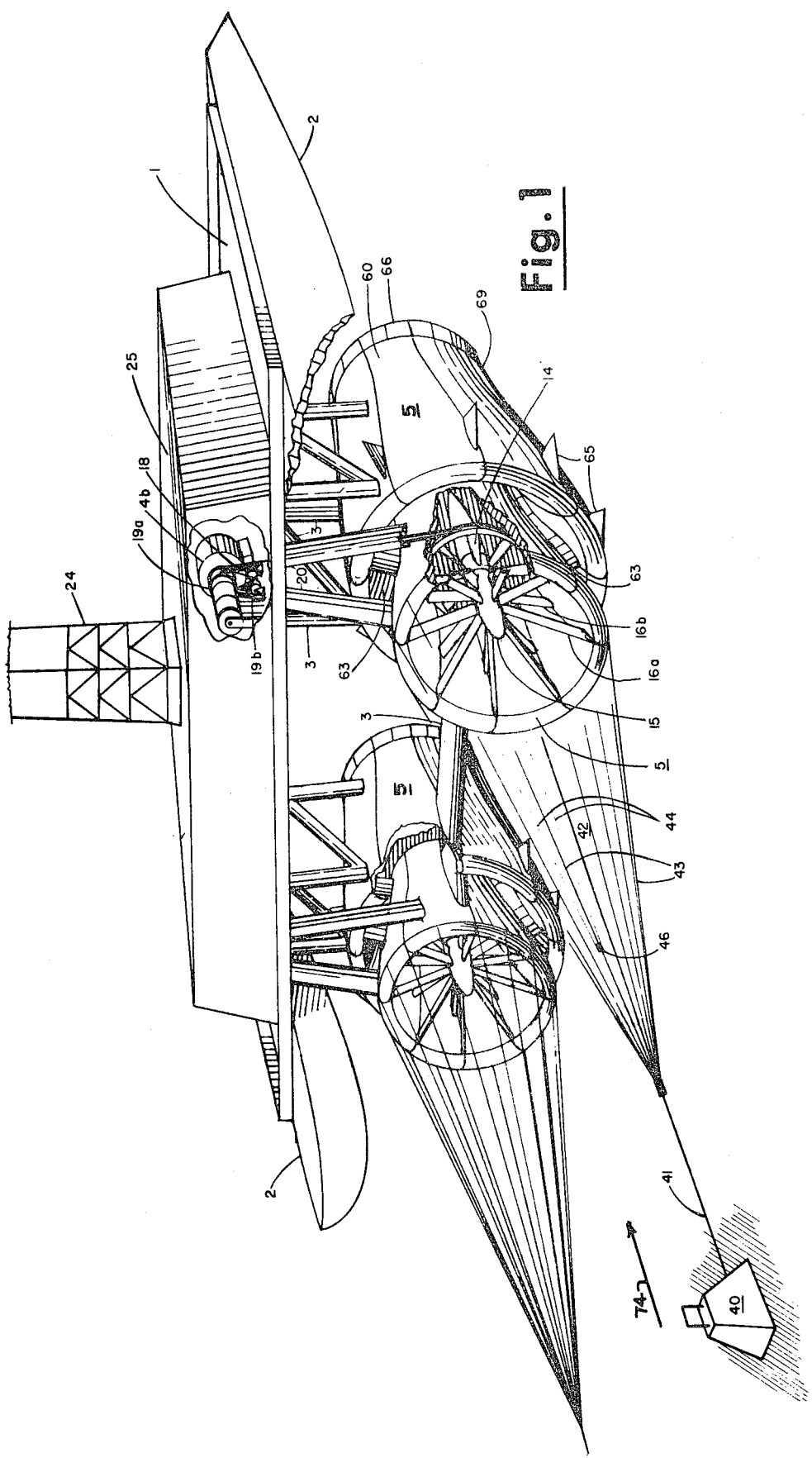
FIG. 1 shows a general perspective view of a dual turbine system.

Water power plants associated with the use of dams to impound the water, and pass it through waterwheels, (and in later times through turbines) have undergone centuries of development. As a result, where dams can be used, and where a good fall of water is available, such power plants can be highly efficient, and are used throughout the world for the generation of electrical power.

There are many situations, however, where (1) damming of the flowing water is prohibitively expensive, (2) is impossible because of soil conditions, (3) is impossible because of geographic conditions, or (4) is impracticable because of navigational needs for the flowing water. Among the situations preventing the successful use of impounded water for hydroelectric purposes are the following:

(1) Deep layers of alluvial soil overlaying impossibly deep bed rock, whereby construction of foundations for dams is totally impractical.

(2) Broad flat valleys, such that small rises in water level would innundate huge acreages of valuable land, and small drops in water level would lay bare large areas of mud flats.

(3) Related to the above, lack of nearby mountain ridges between which dams could be built.

(4) Large ocean currents, remote from land.

Applicants have invented an improved fluid current turbine system which is the subject of the basic patent application Ser. No. 467,772 hereinbefore cited. This turbine has a horizontal axis, and is suspended in the fluid current within the throat of a nozzle which intercepts part of the fluid current; that part flows through the nozzle and through a turbine wheel, which extracts part of the energy of the fluid current.

The present application relates to an improvement in the construction of the turbine wheel and its struts; the invention had been generally disclosed in the said application Ser. No. 467,772 and its continuation in application Ser. No. 622,568, but is now claimed with added detail in the present application.

DEFINITION

Webster's Collegiate Dictionary, Fifth Edition, published by G & C Merriam Co. Springfield, Mass. 1947 defines catenary as: "The shape assumed by a perfectly flexible cord in equilibrium under given forces . . . exemplified in a chain or heavy cord hanging freely between two points of support. It has been applied in construction of suspension bridges."

It will be shown later in this application that a cord, chain or other tensile member drawn taut between two points of support, and then subject to forces perpendicular to the tensile member, suffers extremely large tensile forces for only small perpendicular forces. In contrast, if the cord is connected in relaxed fashion across the points of support, the same applied perpendicular force produces only moderate tensile forces. For the purposes of this patent application the term "relaxed catenary" defines a catenary in which the bow or dip of the curve below a straight line connecting the supports is at least one percent of the distance between the supports.

SUMMARY STATEMENT OF THE INVENTION

The above objects and others are accomplished in a fluid-current motor including an axial-flow turbine wheel having sets of elongated blade structures extending radially from a central hub to a shroud-ring rim, said shroud-ring being retained in a circumferential recess within the throat of a surrounding coaxial nozzle, said nozzle carrying sets of elongated strut structures and sets of elongated strut-vane structures extending inwardly from the inside of the nozzle to any axial wheel-hub-bearing housing associated with said wheel, the improvement comprising providing at least one of said sets with preshaped tensile members in the form of relaxed catenaries, with catenary bows lying at least partially in the fluid force directions.

More specifically the objects are accomplished in a fluid current motor of the type having an axial flow turbine wheel mounted for rotation on a horizontal axis coaxial within the throat of a primary nozzle, the said nozzle when in use being tethered within the said current and a portion of the current flowing through the said throat and wheel, the throat having a concentric annular recess in which are mounted radial and thrust bearings, the turbine wheel comprising:

(1) a shroud-ring rim coaxial within the throat, supported on said bearings for rotation within the said recess, and carrying blade end supports on the inner side of the shroud-ring, (2) a hub centered on the turbine wheel axis, and carrying blade end supports, (3) a set of blades, extending radially from the blade-end supports on the hub to the blade-end supports on the inner face of the shroud ring, wherein each blade of said set is preformed in the direction of fluid current force upon said blade into a lengthwise shape at least appraoching a section of a relaxed catenary figure with axis of symmetry within the diameter of the said shroud-ring rim.

In one form the turbine wheel described above has axes of symmetry for the said relaxed catenary figures located between the axis of the wheel and the rim.

In another form, the turbine wheel has the axes of symmetry of the said relaxed catenary figures all coincident with the axis of the wheel.

In another form the turbine wheel has each turbine blade bowed into a relaxed catenary shape not only in the direction of water flow but also in the direction of fluid force upon the blades of the turbine wheel.

In other forms of the invention, not only are the turbine wheel blade structures preshaped into relaxed catenary configuration in their tensile elements from blade end to blade end, but also the struts and/or the strut vanes that support any central bearing housing associated with the turbine axis, are of preshaped relaxed catenary configuration in the lengthwise tensile elements.

In some forms of the invention, the relaxed catenary may be inverted, with its bow facing into the force of the fluid stream rather than facing away from the fluid force.

DETAILED DESCRIPTION OF THE INVENTION

Figure 2:
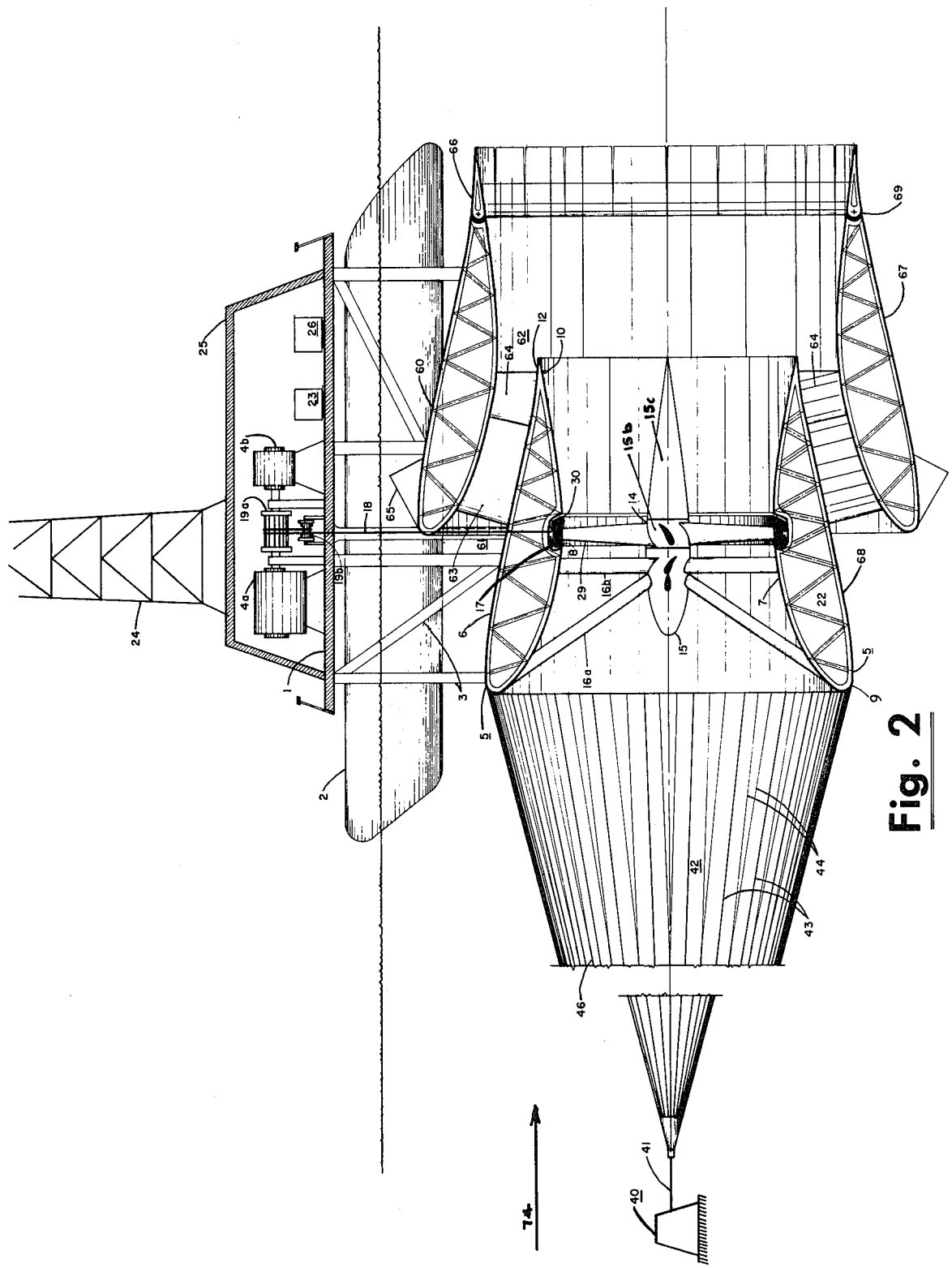
FIG. 2 shows a longitudinal cross-section of one nozzle and a turbine wheel within this nozzle.

FIG. 1 shows an isometric view of two of the nozzle and turbine arrangements of this invention in side-by-side arrangement. FIG. 2 shows a single nozzle of FIG. 1, in longitudinal section, mounted below a pontoon and machinery-deck structure, in a location within a river, where the river current 74 impinges from the left, and flows away toward the right. In all the figures, corresponding elements carry the same designating numerals, even though their shapes may vary slightly from one specific version of the invention to another. Where the differences are so substantial as to cause confusion, separate designators are used.

In FIGS. 1 and 2, item 1 designates the deck of a boat-like structure, which is supported on structural framework 3, above two or more pontoons 2, spread apart in catamaran-like fashion, with space between and below each pair of pontoons. In this space there is located a primary nozzle structure 5, connected through elements of the structural framework 3 to pontoons 2, and the deck 1. Above the deck 1 is a cabin structure 25 and a transmission-line support tower 24. Mounted on the deck are electrical generators 4a and 4b, their drive pulley 19a, an idler pulley 19b, electrical control gear 26 and water pump means generally designated as 23.

The primary nozzle structure 5 as shown in FIGS. 1 and 2 is constituted of a shell 6 and a liner 7. The left, or front, end of shell 6 is smoothly joined to the entrance end 9 of liner 7, for low fluid flow resistance, both for entrance of a portion of the river current into a waterway through liner 7, and for the mainstream of river current passing around shell 6. Liner 7 continues from its entrance end 9 to a throat 8, which is the part of the waterway through the liner of least cross section. At the throat 8 is an annular recess 30, see FIG. 7, occupied by a shroud ring 17, which interrelationship will be detailed subsequently and in other figures. Downstream of the throat the liner 7 continues to a discharge section 10, at which section the cross-section of the waterway through the nozzle has increased as the result of the flaring of the liner.

Within the waterway of primary nozzle 5 there is a turbine wheel 14, having in some configurations a central shaft 13 coaxial with the waterway's throat 8, blades 29, and a shroud ring 17 attached to the outer ends of blades 29.

It was previously mentioned that the shroud ring 17 of turbine wheel 14 is let into an annular recess 30 in the throat 8 of the waterway. This detail and others related are shown in FIGS. 7, 10 and 11. It is important for minimum water flow resistance that the inner face of the shroud ring 17 be a smooth extension of the adjacent waterway surface in the region of throat 8.

An aspect of the basic invention is the use of the shroud ring, not only as structural support for the outer ends of the turbine blades 29, but also for transfer of the axial load from the blades to the surrounding nozzle structure. In this form, no central shaft is needed, but only a streamlined hub interconnecting the central ends of the blades, as pictured in FIG. 4. As shown in FIGS. 7 and 10, the downstream side and periphery of the annular recess 30 are provided with a water bearing porous structure 27b, and 27c and a suitable pressurized supply of water 27a through pipes 27, whereby deflections of the shroud rim under pressure of the river current against the turbine blades is cushioned in a layer of water maintained in the space between the edge of the shroud ring and the adjacent wall of the annular recess.

As shown in FIG. 11, there may alternatively or additionally be a set of mechanical roller bearings 81 disposed in this space.

An advantage of the mechanical bearing is that in case of failure of water supply to the water bearing, catastrophic destruction of the river turbine would not result.

FIGS. 2 and 7 also show endless belt (18) power takeoff means riding in groove 21 and conveying power to generators 4a and 4b. This power takeoff system was discussed in detail in the earlier application of which this applicaton is a continuation, and will not be discussed further except to say that this takeoff means while not detailed in subsequent FIGS. 8, 10, and 11 is also used in the present invention.

The blade itself for highest efficiency of the turbine must be very carefully designed, with the most effective profile in each radial section, and changing profile and angle of attack from axis to shroud end. An important consideration is the avoidance of cavitation, because cavitation would not only increase the frictional drag (thereby converting mechanical energy into wasteful heat) but also might cause destructive erosion of the blade surface.

It is an advantage of the present invention that the turbine wheel will be rather deeply submerged below the water surface, and the differential head of water between the surface and the uppermost edge of the turbine will be of considerable magnitude; the greater this head, the greater the absolute pressure in the water, and the more that the pressure must be reduced before cavitation will take place.

However, even this advantage may not be sufficient, and the blades' profiles must be selected using known hydrodynamic principles so that the pressures on the back sides of the blades (where pressures are lowest) will not get so low as to permit cavitation to occur. Blades, which, by their shape delay the formation of negative peaks of pressure are the best. Toward the outer ends of each blade the sections are accordingly thinner, and are tilted to cut into the water at a more acute angle.

Toward the axis end of each blade, the relative velocity is smaller for a given number of revolutions per minute of the wheel, and the section may both be thicker and be tilted more squarely to the rotational direction.

In order to obtain the desired hydrodynamic shapes together with large strengths and reasonable cost, it is almost essential that modern fiber-reinforced plastics technology be utilized. Preferably, the blades are made with fiberglass/polyester or epoxy construction, with rigid foam core 79 in the thicker sections. Continuous filaments 76 of glass extend lengthwise of the blades, for tensile strength. For torsional strength, belts 75 of filaments extend diagonally across the widths of the blades. Where a core 79 is used, it may be of rigid polyurethane preshaped to establish the basic shape of the blade.

For very large turbine wheels, where the force of the river current exerts a large bending force on the blades, it may be difficult to obtain sufficient resistance to bending while maintaining desirable blade sections. Some solutions to this problem are forms of a relaxed catenary blade, as shown in FIGS. 3 to 9. In construction of FIG. 3 the blade is deliberately formed into a bowed U-shape, in the direction toward which the current tends to force it. The preshaping is sufficient to make the blade a relaxed catenary with axis of symmetry between its two ends; the forces in it are then mainly pure tension, and any tendency to further bending in the direction parallel to the axis is eliminated. Such a construction takes full advantage of the excellent strength characteristics of modern composite materials.

Figure 4:
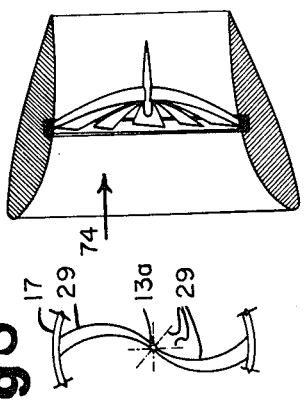
FIG. 4 shows a turbine wheel with blades bowed into relaxed half-catenaries with axes of symmetry coincident with the turbine wheel axis, and with the central bearing structure eliminated.

The above described catenary blade construction can be carried a step further, as shown in FIG. 4. In this version each blade can be designed to be (when under load) approximately one half of a symmetrical relaxed catenary with axis on the centerline of the wheel, and extending entirely across the diameter of the turbine wheel. By such a design, the forces parallel to the axis are transformed into tension in the catenary, and the thrust on the central shaft is eliminated; all of the load of the impulse of the river current is transferred directly to the shroud ring and through its water bearings to the surrounding primary nozzle structure. Having thus eliminated all of the axial thrust forces, it becomes possible also to eliminate the central support of the wheel, by locating trunnion bearings around the outside of the rim of the shroud, in order to support the turbine wheel radially as well as axially. These bearings are preferably water bearings as in FIG. 7 and FIG. 10, but (as in FIG. 11) may also be rollers supported in bearing blocks as conventionally used in the support of large rotating horizontal structures such as ball mills and rotary kilns. With both the axial and the radial supports eliminated from the wheel, the entire central bearings, housing 15, and struts 16a and 16b are eliminated, as indicated in FIG. 4.

Figure 5:
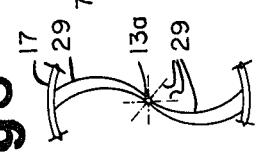
FIG. 5 shows a turbine wheel having blades shaped as relaxed catenaries preshaped in the fluid force directions.
Figure 3:
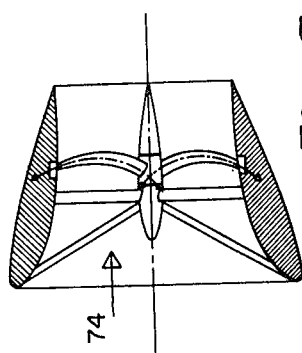
FIG. 3 shows a turbine wheel with blades bowed into relaxed catenaries with axes of symmetry parallel to the turbine wheel axis.

A further step in the use of catenary design of the blade is to curve the blade in the circumferential direction in which it is thrust by the impinging water currents, as well as in the axial direction. This design is indicated in FIGS. 5, 6, and 9. The former shows in fragmented fashion a face-on view of a turbine wheel. In FIG. 5, only two complete blades are shown, the others being indicated by the dotted lines extending from the central hub. Each of the blades has a relaxed catenary shape as seen from this viewpoint, as well as the relaxed catenary shape seen in FIGS. 4 and 8. Thereby all bending forces in any direction are eliminated, and the lengthwise forces within the blade are tension. As in FIGS. 4, 6 and 8, there being no axial thrust, the hub serves only as a connector for attaching the central ends of the blades to one another. Accordingly no central bearing is needed, and none is shown.

Each of the several shapes of relaxed catenary blades in the afore mentioned paragraphs can be constructed in several forms relating to the placement and distribution of the longitudinal tensile elements which are preformed with the relaxed catenary shape. One of these forms has the tensile elements 76 which may be cables, wires, ropes, strings, and/or filaments of metal, glass, or plastic distributed more or less generally throughout the blade, extending from end to end, transversely of the hydrofoil of the blade. A cross-section of this form is illustrated in FIG. 16, Alternate A.

Another form has the lengthwise tensile elements 76 concentrated mainly in the surface, forming a tensile skin, the interior of which may be filled with a rigid foam. A cross-section of this form is shown in FIG. 16, Alternate B.

Yet another form has the tensile elements concentrated into a single tensile cable 82 passing through the interior of the blade, and located at or near the center of pressure. This form is illustrated in FIGS. 9a and 9b.

And another form is shown in FIG. 16, Alternate C. In this form, the tensile elements are located in two cables 82 and 92, one somewhat ahead (upstream) of the center of pressure, and the other considerably to the rear. This form is particularly desirable where the blade's angle of attack is to be shiftable, because the pair of cables facilitates application of the necessary leverage to the blade for angle control.

In FIGS. 8 to 13 inclusive are shown a preferred form of catenary blade construction. The basic idea of this blade is that the blade is built up around a principal tensile cable 82 extending with relaxed catenary shape the whole length of the blade from a point of attachment on the inside of the shroud-ring rim (83 in FIG. 10) to a second point (82a in FIG. 12) of attachment in the outer surface of a streamlined hub located on the centerline of the turbine system.

This principal tensile cable 82 is laid out in the shape of the desired relaxed catenary figure, and then has assembled around it the remaining blade structural elements that produce the desired "air foil" (more appropriately called "water foil" or "hydro-foil" surfaces.)

In a one-piece blade, shown in cross-section in FIG. 9a, made preferably of fiber glass and polyester or epoxy with cores 79 of foamed plastic, the first step is the preparation of the cable 82, using known technology for the preparation of glass fiber and polymerizable plastic objects. For cables of diameter large compared with their length, the glass fibers may be loosely draped, or laid out in a mold, with the desired relaxed catenary configurations, and then impregnated with the polymer. For cables that are long compared with their diameters, the glass fibers can be laid straight, then impregnated, and either before or after polymerization, transposed into the relaxed catenary configuration.

A typical 80 ft. diameter turbine wheel with 16 ft. hub might use 32 ft. long cables, that for a strong current might need to be of about 8-in. diameter, and be used in a catenary with a 7-inch dip on its axis. For such a case either of the previous cable-forming techniques could be used.

In the next stage of construction, the hydrofoil blade 80 is built up around the shaped cable, again using known technology for polymer-glass construction. Typically, the cable might be laid in molds for the blade, the cable being preshaped in its desired relaxed catenary configuration. Then around the cable would be assembled the foil skin of sheets of fiberglass impregnated with prepolymer, together with preshaped blocks of rigid foamed plastic material for the cores of the blade foil.

Alternatively, as shown in FIG. 9b the blade hydrofoil can be made leaving an open groove running the length of the blade, having the desired relaxed catenary shape. In FIG. 9b, 80 denotes the blade in cross-section, with foam blocks 79, the cable 82 in its groove, and the open face of the groove covered with enclosure piece 78 held in place with bolts 77.

In order that the pitch, or angle of attack, of the blade may be changed at will, it is desirable that friction between the cable 81 and its enclosing blade 80 be minimized. To this end cable 82 may be wrapped or coated with a low friction material such as sheet Teflon, before the hydrofoil is built up around it.

It is to be emphasized that, unlike the wire spokes of a bicycle wheel, and unlike the elements of certain prior art turbine blades, the cables are not stretched taut between the fastenings in the rim and the fastenings in the hub, since such stretching or any lay-up of the cables in straight lines rather than relaxed catenaries, would be outside the essential feature of the present invention.

The heart of the present invention is the employment of a relaxed catenary in the longitudinal structure of each blade, extending between shroud-ring rim and central hub. Some prior art turbine wheel structures used pretensioned straight spokes between rim and hub, which spokes when exposed to the fluid stream parallel to the axis might perhaps have been deflected into taut catenaries, in which the tensile forces would have been very large, compared with the fluid forces.

In contrast, in the present invention, the blade longitudinal tensile elements are designed and constructed into the blade as relaxed catenary tensile elements, which upon fluid pressure loading, attain only small to moderate tensile forces.

Figure 18:
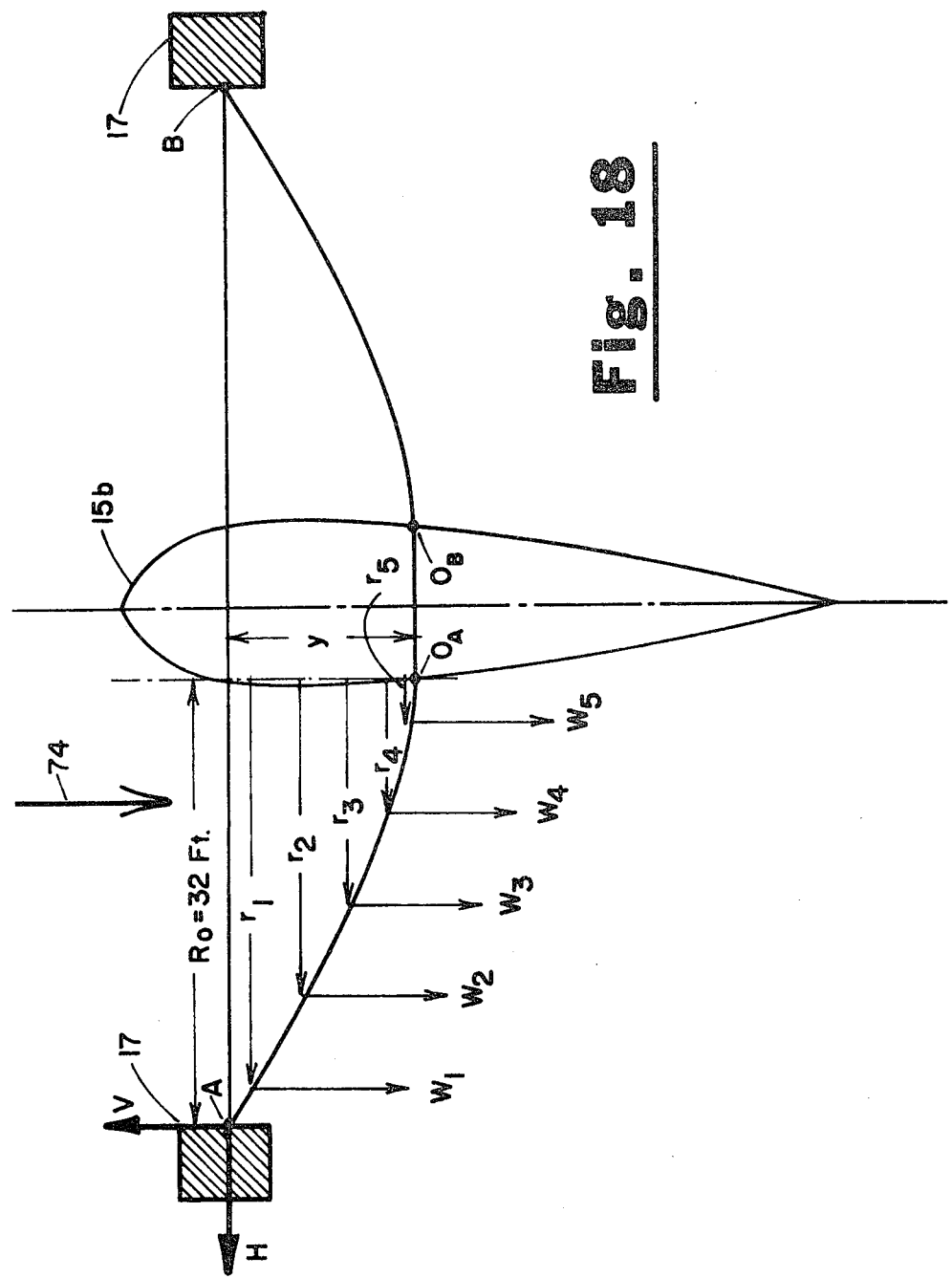
FIG. 18 shows a diagram of forces in a catenary.

For better appreciation of the importance of relaxed catenary blade construction in the turbine wheel of the present invention, a simplified analysis is presented next, showing the interrelationship of the forces involved. FIG. 18 shows two half catenaries, that together form a whole catenary extending from rim inside to rim inside. The first half, on the left, extends from the rim attachment at A to the surface of the hub (assumed rigid) at $O_A$. The second half extends from the opposite side of the hub at $O_B$ to the opposite inside of the rim at B.

The axial dip or bow of the catenary, relative to the points of attachment is designated $y$, and is the direct measure of the degree of relaxation of the catenary. The inner radius of the rim, from A or B to the hub outside diameter is designated $R_o$. (For the present analysis, only the components of fluid forces and reactions in a plane through the axis will be considered. Real blades have hydrofoil surfaces inclined to the fluid stream. In a real blade, for every force parallel to the axis, there will be a force at right angles, causing the wheel's rotation, and these rotatory forces will induce other catenary-type forces in the blade tensile elements, the effect of which forces can be treated by extension of this simplified analysis).

In a real turbine wheel, to which is applied a uniform velocity front, each blade will receive the fluid forces representing the fraction which the blade is, of all the blades on the wheel. The area of fluid flow against the blade is proportional to the square of the radius. Accordingly, the outer reaches of the blade, at larger radius, are more heavily loaded than the portions near the hub.

For balance, the sum of the moments of the various forces in the system must equal zero. A convenient reference point about which to make the balance is the bottom of the dip in the catenary, designated $O_A$ in the figure. The length of the catenary is subdivided for purposes of the analysis into several sections at equal increases in radius. Five sections are shown in the figure, designated 1, 2, 3, 4, and 5. The fluid force in the sections is designated $w_1$, $w_2$, $w_3$, $w_4$, and $w_5$, respectively, and the moment arm of the force is taken at the mid-radius of the section, designated $r_1$, $r_2$, $r_3$, $r_4$, and $r_5$, respectively.

The fluid load on the catenary produces the moments:

$$w_1r_1 + w_2r_2 + w_3r_3 + w_4r_4 + w_5r_5,$$

all of these moments downward parallel to the axis in the figure. Opposing these moments is the moment of tension T in the catenary at the point of attachment to the rim; this tension may be resolved into a horizontal force H at the rim, equal to the same force H at the catenary's center O, and an axial supporting force V directed upward. These moments are:

$VR_o$ and Hy, the first moment being of opposite algebraic sign compared with the w.r moments.

The sum of all the moments is $$VR_o = Hy + \Sigma(w.r), \text{ or}$$

$$Hy = VR_o - \Sigma(w.r)$$

This equation makes apparent that increasing the value of relaxation parameter $y$, decreases the tension in the cable in reciprocal manner.

EXAMPLE

Assume an 80-foot diameter wheel, with a 16-foot diameter hub and 8 blades as in FIG. 9. Assume a drop in fluid pressure of 209 lb./sq.ft., as the fluid passes through the wheel. Calculate the shape and forces in the catenary tensile member, as projected onto a plane through the axis and through the point of attachment of the tensile member to the rim. Make the calculation at several degrees of relaxation of the catenary.

Wheel Load

See FIG. 18. Divide the wheel into 5 annular zones between the hub and the rim, all zones being of equal width, and, since there are 8 blades in the wheel, into angular zones of 45°.

Rim: 40-ft. radius
Hub: 8-ft. radius
Difference: 32 feet
Width per zone = 32/5 = 6.4 ft.

| Zone | Radius Outer | Radius Inner | Area intercepted by each blade* | Load, at 209 lb./ sq. ft. |
|---|---|---|---|---|
| 1 | 40 ft. | 33.6 ft. | 185 sq.ft. | 38,600 lb. |
| 2 | 33.6 | 27.2 | 153 | 31,900 |
| 3 | 27.2 | 20.8 | 121 | 25,200 |
| 4 | 20.8 | 14.4 | 88 | 18,400 |
| 5 | 14.4 | 8 | 56 | 11,800 |
| * 45° Angular Zone | | | Total Load | 126,000 lb. |

Moments

| Zone | Load | Moment arm radius | Moment |
|---|---|---|---|
| 1 | 38,600 lb. | 36.8 ft. | $142 \times 10^4$ ft. - lb. |
| 2 | 31,900 | 30.4 | 97 |
| 3 | 25,200 | 24.0 | 60.5 |
| 4 | 18,400 | 17.6 | 32.4 |
| 5 | 11,800 | 11.2 | 13.2 |
| | | Sum of Moments | $345 \times 10^4$ ft.-lb. |

Moments at the rim are:

$$VR_o = 12.6 \times 10^4 \text{ lb.} \times 32 \text{ ft.} = 403 \times 10^4 \text{ ft. lb.}$$

$$Hy = VR_o - \text{sum of zone moments} = 403 - 345 = 58.2 \times 10^4 \text{ ft. lb.}$$

| Effect of Catenary Relaxation on Tension | | | |
|---|---|---|---|
| y | | H | $T = \sqrt{H^2 + V^2}$ |
| % of span* | ft. | lb. | lb. |
| 0.1% | 0.064 | $9.09 \times 10^6$ | $9.09 \times 10^6$ |
| 1.0 | 0.64 | $0.909 \times 10^6$ | $0.918 \times 10^6$ |
| 7.0 | 4.48 | $0.180 \times 10^6$ | $0.181 \times 10^6$ |
| 10.0 | 6.4 | $0.0909 \times 10^6$ | $0.155 \times 10^6$ |
| 15.0 | 9.6 | $0.0606 \times 10^6$ | $0.140 \times 10^6$ |

*Span equals rim I.D. less hub O.D. = 80 − 16 = 64 ft.

A typical cable material might be linear fiber glass in a matrix of epoxy resin, with Young's Modulus of 5,000,000 lb./sq.in., and tensile strength of 180,000 lb./sq. in. With conservative design, the tensile loading might be taken at 50,000 lb./sq. in.

| | Calculation of Cable Diameter | |
|---|---|---|
| y,% of span | Tension | Cable Diameter |
| 0.1% | $9.09 \times 10^6$ lb. | 15.2 in. |
| 1.0 | $0.918 \times 10^6$ lb. | 4.84 |
| 7.0 | $0.181 \times 10^6$ lb. | 2.15 |
| 10.0 | $0.155 \times 10^6$ lb. | 1.99 |
| 15.0 | $0.140 \times 10^6$ lb. | 1.89 |

From the above tabulation it will be apparent that by the use of the relaxed catenary, having, as earlier defined, an axial dip, $y$, of 1.0% or greater, the cable tension is greatly reduced, as compared with the taut catenary with dip $y$ equal to 0.1%, and the cable diameter can be 4.84 inches or less, rather than 15.2 inches.

Certain details of the construction have not yet been described. Among these is the method of suspending relaxed catenary blades between shroud-ring rim and hub, and the nature of the hub and of the shroud ring.

The cross-section of the shroud ring 17 is encircled in FIG. 8, and shown in greater detail in the enlargements in FIGS. 10 and 11. The ring 17 may have a generally rectangular cross-section, with openings on its inner (rim) side, into which openings the radially outer ends 82a of the tensile cables, such as cable 82, are inserted and anchored. The shroud ring is made stiffer and more rigid by having numerous rectangular plates 84 fitting the interior cross-section. In the case of steel rings, the plates can also be of steel, welded into place.

Between adjacent plates 84 may be placed retention pins 83, extending not only through holes in plates 84 but also through the bight of a loop 82a forming the end of cable 82. A wrapping 85 of fiber glass and epoxy, or material of similar effectiveness, is polymerized in place around the base of the loop to hold it in shape and to bring the fibers down to the diameter of cable 82.

Bearing structures for the support of the turbine wheel by its rim were earlier mentioned, in connection with FIG. 7. In more detail, FIG. 10 shows a cross-section of the shroud ring supported on a set of peripheral water bearings 27c, and a second set also 27c, located on the down-stream side of the ring. In FIG. 11 are shown the alternative or supplemental mechanical roller bearings 81 supported on their trunnions on both peripheral and downstream sides of the ring. For the water bearings, the bearing facial areas, bearing water pressure, bearing face porosity and other factors, are all integrated to maintain a load-resisting film of flowing water between the porous faces and the ring.

For both kinds of bearings, it will be clear that the recess 30 in the nozzle throat 8 is a continuous annular recess, adequate in size and shape to take in not only the shroud ring but also a ring of either or both kinds of bearings. Not shown in FIGS. 10 and 11, but shown in FIG. 7, would be belt grooves 21 and belts 18.

Next will be described the central hub of the turbine wheel, and the attachment of the inner ends of the blade cables. Pitch control will also be covered.

In FIG. 8, a cut-away portion of the hub is shown, where the tensile cables connect. This region is shown in more detail in FIGS. 12 and 13, FIG. 13 being a side view of the cut-away hub section seen in FIG. 12.

The main structure of the hub 15b may be a pair of inwardly flanged rings 91 with flat sides facing one another, but separated sufficiently to permit the entrance of the tensile cables 82 with their loops 82a. Extending across this separation, through the loops 82a, and through corresponding holes in the rings 91 are cable retention pins 83, like those at the shroud-ring rim. The hub is enclosed with a fairing jacket like that designated 15b.

In order that the pitch of each blade 80 may be changed, the end of the blade may have a special end piece 86 carrying a pitching pin 87, with centerline parallel to the cable centerline. A slot 90 is provided in the wall of the hub, sized and shaped to enable the pitching pin 87 to enter into the inside of the hub and to be moved through the pitching angle about the cable end as center. Within the hub the end of pin 87 has rotatably attached to it the end of piston rod 89, the piston being enclosed in hydraulic cylinder 88, which is so mounted within the hub that movement of the piston within the cylinder causes angular movement of pin 87 in the slot 90, which movement changes the pitch of blade 80 as desired, to correct for changes in water velocity, changes in power demand, feathering of the blades before shutdown, etc.

While only one pitch changing system is shown here, it will be clear that each blade will be similarly equipped. Furthermore, the blade ends attached to the shroud-ring rim may be similarly changed in pitch, as indicated diagrammatically in FIG. 6 at 86, 88, and 89.

In some situations, change of pitch may be more easily accomplished by the use of blades each of which have two tensile cables extending the length of the blade (see FIG. 16, alternate C): a first, primary tensile cable 82 would be located as previously explained near the center of pressure of the chord of the hydrofoil, and a second tensile cable 92 would extend generally parallel to the first, but further aft. By attaching each end of the second cable, which may be called the pitch-control cable, to hydraulic actuators 88, 89 like that shown in FIGS. 12, 13, and 6, this cable may be moved as desired and with it the pitch of the blade altered.

Some situations may call for a different angular change of pitch near the hub than near the rim of the wheel. Such a need would require that the blade be somewhat flexible in torsion. To this end, the hydrofoil of the blade can be cut into segments, each of which has two passageways, one for the main tensile cable 82 and a second for the pitch-control cable 92. In FIG. 6, this type of construction is indicated, each blade having end pieces 86 through which connection is made to the rim and hub, and intermediate segments 93 strung along the length of the primary tensile cable 82 and the pitch control cable 92. FIGS. 14 and 15 illustrate one means for permitting the pitch control cable 92 to pass through each segment 93 at a small angle with respect to the passageway 73 through the segment. The passageway 73 is deliberately made somewhat oversize, and near the middle of its length the diameter is reduced in such a way as to enclose a spherical socket 72. In this socket is contained a ball 71, or bead, through which is strung the cable 92, thereby supporting the midpoint of the segment at the desired pitch angle, while letting the cable pass without hindrance to the adjacent segments.

FIG. 17 shows another form of blade segment. In this form, each segment is a distinct and complete articulation 70, separable from adjacent ones, and carrying its own tensile elements within it. Each tensile element (68 at the front, and 69 at the rear) is an extended chain link, passing through the articulation from one edge to the other. Each link has link joint ends 66, mating with the corresponding ends protruding from the edges of the adjacent articulations. The joint ends are pinned to one another with link joint pins 66. Each articulation has a convex edge 64 to mate with a concave edge of the adjacent articulation and to enable the articulations to conform to the prescribed preshaped relaxed catenary desired for the whole blade. Recesses are formed in the convex edge 64 within which are located the link joints 67 and their pins 66. Access to these recesses for assembly or disassembly of a blade is had by removal of cover plates 63.

In the previous sections several forms of an axial flow turbine wheel have been described, all forms being based upon a generic form embodying the use of preshaped relaxed catenary tensile members or elements extending the length of the blades of the wheel. It will be apparent that this same generic form is also applicable to the struts 16a and strut-vanes 16b shown in FIG. 19 for turbine designs where struts and/or vanes are required. The struts 16a, may include within their fairing the relaxed catenary tensile elements such as cable 82. Similarly, the strut-vanes 16b may include cable elements 82 and 92 in relaxed catenary shape, together with pitch-changing means 88 and 89 at their mountings on the inside of venturi throat 7, and on the surface of the wheel-bearing housing 15a.

It will also be apparent that the relaxed catenary concept is applicable not only to turbine wheels and their associated struts and strut vanes used in converging-diverging nozzles like those shown in FIGS. 1-5, inclusive, but also to other shapes of nozzles; several such shapes were illustrated in application Ser. No. 467,772, filed May 7, 1974, of which this application is a continuation in part.

For nozzle shapes where no place exists upstream of the nozzle for attachment of struts to support the turbine wheel hub, the relaxed catenary tensile member can be inverted, and placed downstream of the turbine wheel, as an inverted catenary compression arch. Such a design is shown in FIG. 20, for the downstream strut 16c. In this design, the nozzle 5 has only a very short initial converging section to the throat 8, after which it flares gradually to a discharge 10. With such a nozzle, if a central shaft and bearing housing is needed, it must be mounted as illustrated on the downstream side of turbine wheel 14. The bearing housing 15a and tail flaring 15c become one, with the wheel hub 15b mounted upstream. Just inside the nozzle entrance is recess 30, containing shroud ring 17 with relaxed catenary blades 80 extending inwardly from the shroud-ring rim to the wheel hub 15b. Not shown in this view are the pitching actuators 88, 89, and associated parts as were earlier described in connection with FIGS. 6, 12, and 13. Just downstream from the turbine wheel 14 is the first set of struts 16a, shown as relaxed catenaries. Somewhat further downstream, where support is needed for the downstream end of the bearing housing 15a, is a set of struts 16c, in the form of inverted relaxed catenaries. The center, or axis, of the catenary is coaxial with the turbine wheel axis, while its supporting ends are attached to supports (not detailed) in the inside of the nozzle yet further downstream.

The inverted catenary, like the ordinary catenary is a structural form well known to engineers. Whereas in the ordinary catenary, as earlier explained, the forces are pure tension, in the inverted catenary the forces are pure compression, and all bending and shear are eliminated. Also, as in the ordinary catenary, the forces are very large if the catenary is not a relaxed catenary as earlier defined.

A variety of forms and uses of the relaxed catenary as load-supporting and force transmitting structures in close association with axial-flow turbine wheels has been described. Other variations of these structures similarly embodying the relaxed catenary concept will occur. Having fully described our invention, it is to be understood that we do not wish to be limited to the details herein set forth, but our invention is of the full scope of the appended claims.

While the foregoing disclosure describes the the improved turbine wheel in connection with its use within nozzles, in river and ocean current applications, the improved wheel is also useful as a component of wind-power devices, with or without a surrounding nozzle. It is accordingly intended that the scope of the appended claims shall include the turbine wheel in such applications.

What we claim is:

1. In a fluid-current motor including an axial-flow turbine wheel having sets of elongated blade structures extending radially from one blade end at a central hub to another end at a blade shroud-ring rim, said shroud ring being retained in a circumferential recess within the throat of a surrounding coaxial nozzle, said nozzle carrying sets of elongated strut structures and sets of elongated strut-vane structures extending inwardly from the inside of the nozzle to any axial wheel-hub-bearing housing associated with said wheel, the improvement comprising: providing at least one of said three sets with preshaped tensile members in the form of relaxed catenaries, with catenary bows lying at least partially in the fluid force directions.

2. A turbine wheel for a fluid current motor according to claim 1, in which the said wheel is mounted for rotation on a generally horizontal axis concentric within the diameter of the throat of said nozzle, the throat having a concentric annular recess, the wheel being comprised of a shroud-ring rim and a set of turbine blades extending from the said axis to the said rim, the said rim being positioned within the said recess and rotatably supported therein on radial and thrust bearings, wherein each blade of the said set has a configuration in a plane through the blade and the axis of the wheel that is bowed in the direction of fluid current motion in a shape approaching at least a section of a relaxed catenary figure with axes of symmetry parallel to the axis of the wheel, said axes of symmetry being within the diameter of the shroud-ring rim.

3. The turbine wheel of claim 2 in which the axes of symmetry of said relaxed catenary figures are located between the axis of the wheel and the rim at the point of attachment of the blade.

4. The turbine wheel of claim 2 in which the axes of symmetry of the said relaxed catenary figures are located on the axis of the wheel.

5. The turbine wheel of claim 2 in which each turbine blade is bowed into relaxed catenary shape not only in the direcion of fluid flow but also in the direction of rotation of the turbine.

6. A turbine wheel for a fluid current motor according to claim 1, in which said wheel is mounted for rotation on a generally horizontal axis concentric within the diameter of the throat of said nozzle, the said shroud ring being positioned within said recess and rotably supported therein on radial and thrust bearings, wherein each blade is of hydrofoil cross-section built up around at least one tension member extending between attachment points at hub and rim, said member having been preformed into said relaxed catenary shape before assembly of the said hydrofoil around the member.

7. A turbine-blade structure for a turbine wheel according to claim 6, comprising (a) a single tensile cable extending from end to end of said blade, preshaped as a relaxed catenary, and (b) a hydrofoil structure enclosing said cable.

8. A turbine-blade structure for a turbine wheel according to claim 6, comprising (a) a first tensile cable extending from end to end of said blade, preshaped as a relaxed catenary, (b) a hydrofoil structure enclosing said cable and positioned to place the hydrofoil's pressure centerline at least adjacent to said cable, and (d) a second tensile cable located aft in said hydrofoil, extending from end to end of said blade, and (e) pitch-changing means adjacent at least one end of said second cable operative to change the pitch of the blade.

9. The turbine wheel of claim 8 wherein the said pitch-changing means comprises hydraulic cylinder and piston with leverage means operative to change pitch of the blade.

10. A turbine-blade structure according to claim 8, wherein the said hydrofoil structure is subdivided into cross-wise segments which are strung along the said first and second cables.

11. A turbine-blade structure according to claim 6, wherein the blade is subdivided lengthwise into articulations, each articulation being composed of a hydrofoil section enclosing at least one link extending crosswise of the articulation, each link having two link joint ends adapted to mate with and be pinned together with corresponding link joint ends in adjacent articulations, individual articulations being preshaped so that upon assemblage as a whole blade, the links together form at least one chain the shape of which is the desired relaxed catenary.

12. The turbine-blade structure according to claim 11, in which the said articulations each enclose two links, one link being a forward link adjacent the center of pressure of the hydrofoil section and operative in the blade as principal tensile member, the second link being positioned to the rear in the hydrofoil section, and operative with the corresponding links in adjacent articulations as a pitch-changing cable.

13. The fluid-current motor of claim 1, in which sets of struts that extend inwardly from the inside of the nozzle to support an axial hub include as their principal tensile elements, members preshaped as relaxed catenaries bowed in the direction of fluid flow, and having axes of symmetry coincident with the turbine axis.

14. The fluid-current motor of claim 1, in which sets of strut-vanes that extend inwardly from the inside of the nozzle to support an axial hub and to direct fluid against the turbine wheel blades, include as their principal tensile elements, members preshaped as relaxed catenaries bowed in the direction of fluid force, the center of each said relaxed catenary falling upon the turbine wheel axis.

15. The fluid-current motor of claim 1, in which a set of struts is located downstream of the turbine wheel, and the relaxed catenary is inverted whereby all of the tensions are negative.

16. A turbine wheel for a fluid current motor, in which the fluid current is generally parallel to the axis of the wheel, the wheel being comprised of a shroud-ring rim, and a set of turbine blades extending generally radially between said axis and said rim, wherein each blade of the said set is bowed in the direction of fluid-current motion into the shape of a relaxed catenary figure.

* * * * *